UNITED STATES PATENT OFFICE.

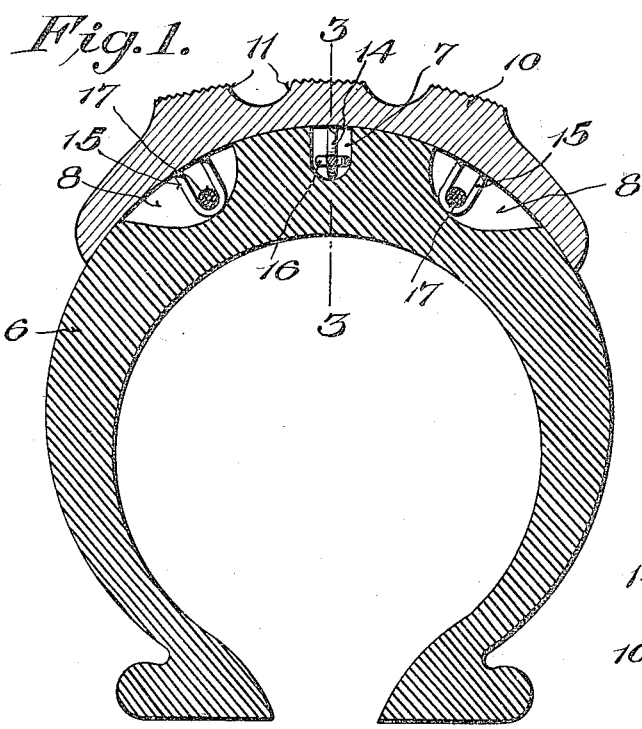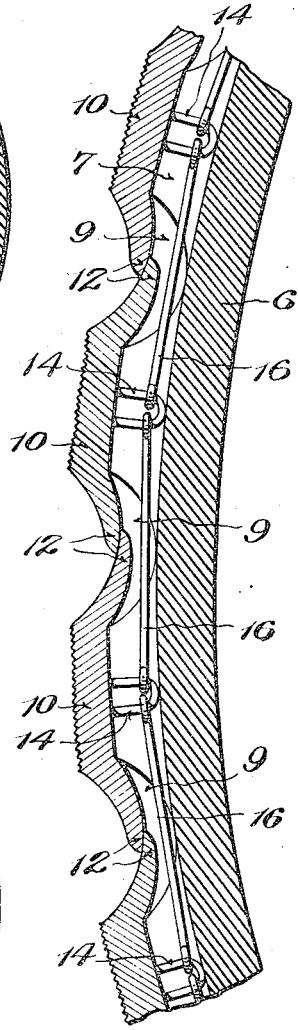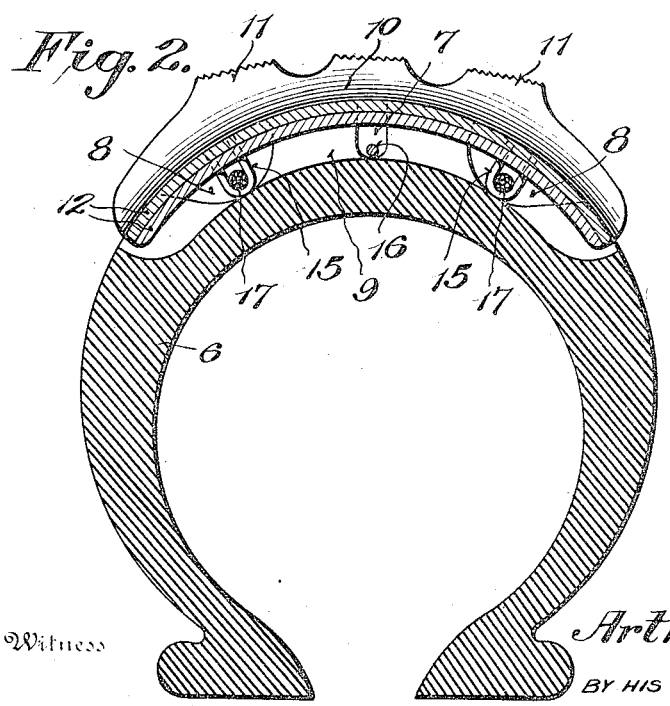

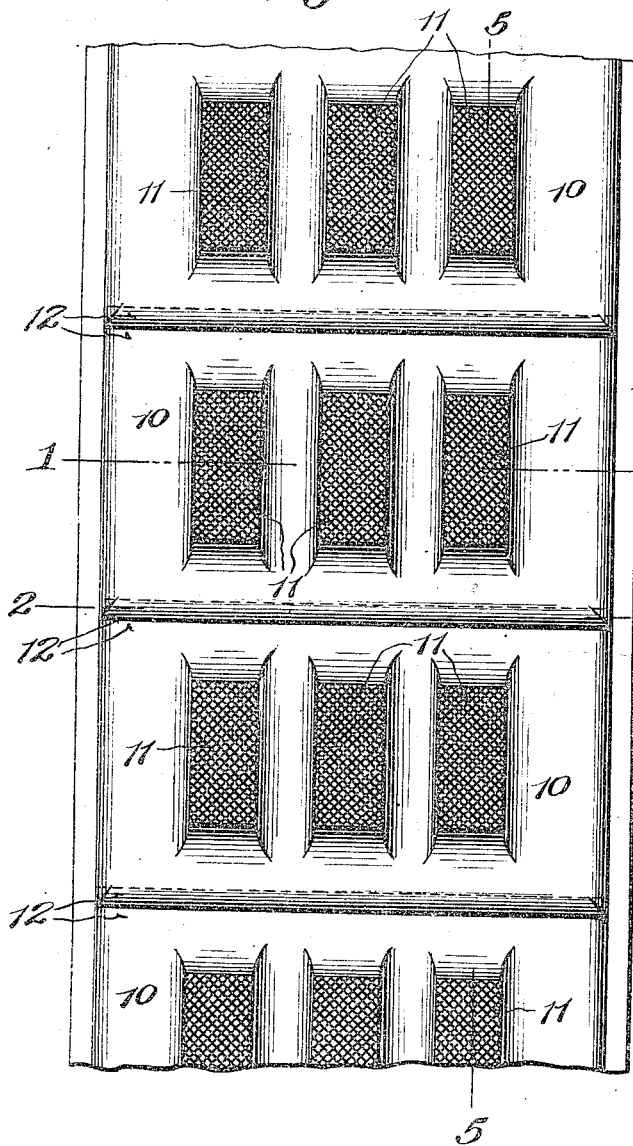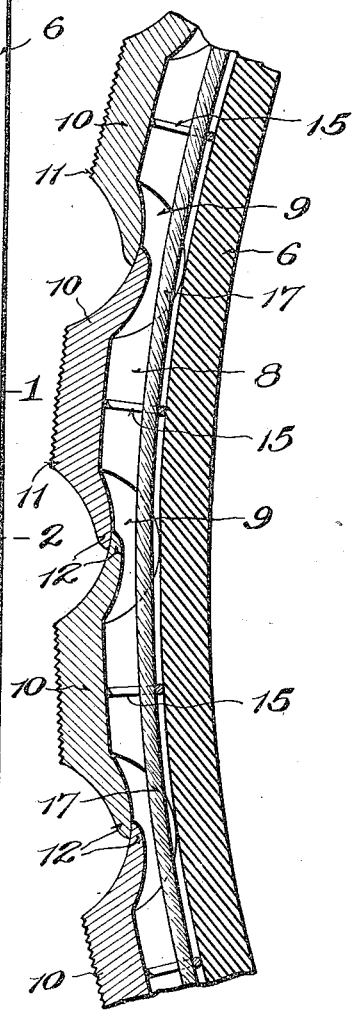

ARTHUR CROMAR BRUCE, OF KERRISDALE, BRITISH COLUMBIA, CANADA.

TIRE-TREAD.

1,262,011.	Specification of Letters Patent.	Patented Apr. 9, 1918.

Application filed June 26, 1917. Serial No. 177,065.

*To all whom it may concern:*

Be it known that I, ARTHUR CROMAR BRUCE, a subject of the King of Great Britain, residing at Kerrisdale, Vancouver, British Columbia, in the Dominion of Canada, have invented certain new and useful Improvements in Tire-Treads, of which the following is a specification.

This invention relates to tires of the kind commonly used on automobile and other wheels, and the object of my invention is to provide such tires with a flexible metal tread to render them more durable and puncture-proof.

According to my invention a rubber tire, known as the shoe, is formed with a series of longitudinal grooves and a series of transverse grooves on its tread portion, and the metallic tread, comprising a plurality of metal plates having overlapping ends adapted to project into the transverse grooves, is secured around the tread portion of the tire. The metal plates are connected by links which are attached to eyes projecting into one of the longitudinal grooves in the tire, and also by cables which extend around the tire in the other longitudinal grooves and pass through eyes on the plates serving to hold the plates in position on the tire. The plates are also preferably provided with a corrugated and roughened outer surface to prevent skidding or slipping.

Referring to the accompanying drawings:—

Figure 1 is a transverse section through a tire embodying my invention and through one of the plates, and is taken on line 1—1 of Fig. 4.

Fig. 2 is a transverse section similar to Fig. 1 but taken through the metal tread where two plates overlap, as on line 2—2 of Fig. 4.

Fig. 3 represents a longitudinal section on line 3—3 of Fig. 1.

Fig. 4 represents a plan view of the surface of the metal tread.

Fig. 5 is a longitudinal section along line 5—5 of Fig. 4.

In the drawings, 6 is a tire of ordinary construction, but it is formed on its periphery with a plurality of longitudinal grooves 7 and 8, extending entirely around it, and a series of transverse grooves 9 extending across the tread portion of the tire and disposed at equal distances around the periphery thereof.

The tread is composed of a series of metal plates 10, having outwardly projecting metal tread portions 11 which may be roughened or corrugated, as indicated, to prevent slipping. Curved end portions 12 of the plates 10 extend into the transverse grooves 9, and overlap each other as shown in Figs. 2 and 3, the transverse grooves 9 being slightly longer than the width of the plates. These end portions 12 are rounded or curved to permit the overlapping portions to slidably engage each other to give the desired resiliency and flexibility to the tire tread. The plates 10 are also curved transversely to conform substantially with the curvature of the tire.

Each plate 10 is provided with eyes 14 and 15 extending into the longitudinal grooves 7 and 8, the eyes preferably being disposed midway between the ends of the plates. The eyes 14 in the middle groove 7 are connected by links 16, and annular cables or the like 17 in the longitudinal grooves 8 pass through the eyes 15, whereby the plates are held firmly to the tire, while the links 16 prevent the plates from moving out of proper position either when the tread is applied to the tire or when it is removed. The cables 17 are contracted and placed under tension.

It will be obvious that by deflating the tire the plates 10 can be detached as an entirety, and the tire could be used without the metal tread plates, but the plates serve to prevent the tire from wearing or becoming punctured, as well as to prevent skidding or slipping. It will also be seen that when the tread plates are removed the longitudinal and transverse grooves form a non-skid tread for the tire casing.

The plates are preferably made of hard steel and may be nickel-plated to prevent them from rusting.

I claim as my invention:—

1. A tire tread, comprising an annular series of plates, links connecting said plates, eyes on the inner sides of said plates, and annular cables passing through said eyes.

2. A tire tread comprising an annular series of plates, each of said plates being provided on each end with a rounded projecting end portion having slidable engagement with the end portion of an adjacent plate, and means for connecting the plates with each other.

3. In combination with a tire casing having a series of transverse grooves therein across its periphery, of a metal tread comprising an annular series of metal plates around said tire casing, said plates having overlapping end portions extending into said transverse grooves which permit of the relative movement of the plates, and means connecting the plates to each other and holding said plates in position around the tire casing.

4. In combination with a tire casing having longitudinal grooves around its periphery, a detachable metal tread therefor, comprising a series of plates extending around the tire casing and conforming substantially with the tread portion thereof, links on the inner surface of the plates for connecting the plates to keep them in proper relation to each other, and cables extending longitudinally around the tire for securing the plates thereto, said links and cables projecting into said longitudinal grooves in the tire casing.

5. In combination with a tire casing having a series of longitudinal grooves and a series of transverse grooves in its tread portion, a tread consisting of a plurality of metal plates having end portions overlapping each other and extending into the transverse grooves and having also eyes on their inner sides extending into the longitudinal grooves, links attached to some of said eyes for connecting the plates with each other and cables extending through other eyes to secure the tread to the tire casing.

6. A tire tread comprising an annular series of plates, tread portions on one side of said plates, eyes on the opposite side of said plates, links attached to some of said eyes for connecting the plates with each other, and annular cables extending through other of the said eyes.

7. In combination with a tire casing, a detachable tread comprising a series of plates having overlapping end portions and having connecting means on their inner surfaces, said tire casing having its periphery provided with a series of transverse grooves and a series of longitudinal grooves, said transverse and longitudinal grooves being adapted to receive the overlapping end portions and the connecting means respectively when the tread is attached and to form an anti-skidding surface for the tire casing when the tread is removed.

8. In combination with a tire casing having a series of transverse and longitudinal grooves in its tread portion, of a metallic tread comprising a series of plates, overlapping end portions on said plates projecting into said transverse grooves in the tire casing, means on the inner surface of said plates projecting into some of said longitudinal grooves for connecting the plates with each other, and cables connected with the inner surfaces of said tread plates in other of said longitudinal grooves for securing the tread plates to the tire casing.

ARTHUR CROMAR BRUCE.

Witnesses:
M. L. RANEY,
E. L. BOTHEL.

Copies of this patent may be obtained for five cents each, by addressing the "Commissioner of Patents, Washington, D. C."